(12) United States Patent
Li et al.

(10) Patent No.: US 8,972,983 B2
(45) Date of Patent: Mar. 3, 2015

(54) EFFICIENT EXECUTION OF JOBS IN A SHARED POOL OF RESOURCES

(75) Inventors: Min Li, Blacksburg, VA (US); Prasenjit Sarkar, San Jose, CA (US); Dinesh K. Subhraveti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/457,090

(22) Filed: Apr. 26, 2012

(65) Prior Publication Data
US 2013/0290953 A1 Oct. 31, 2013

(51) Int. Cl.
*G06F 9/455* (2006.01)
(52) U.S. Cl.
USPC .............................. 718/1; 370/229; 370/351
(58) Field of Classification Search
CPC ... G06F 15/173; G06F 11/301; G06F 9/5077; G06F 9/5072; G06F 8/433; G06F 9/46
See application file for complete search history.

(56) References Cited

U.S. PATENT DOCUMENTS

| | | | |
|---|---|---|---|
| 7,558,217 B2 | 7/2009 | Rodeheffer et al. | |
| 7,784,053 B2* | 8/2010 | Casey et al. | 718/104 |
| 7,865,582 B2* | 1/2011 | Santos et al. | 709/223 |
| 7,921,416 B2 | 4/2011 | Fontoura et al. | |
| 8,145,760 B2* | 3/2012 | Dinda et al. | 709/226 |
| 2005/0120160 A1* | 6/2005 | Plouffe et al. | 711/1 |
| 2008/0082977 A1* | 4/2008 | Araujo et al. | 718/1 |
| 2009/0276771 A1 | 11/2009 | Nickolov et al. | |
| 2009/0300605 A1* | 12/2009 | Edwards et al. | 718/1 |
| 2010/0281166 A1 | 11/2010 | Buyya et al. | |
| 2011/0029675 A1* | 2/2011 | Yeow et al. | 709/226 |
| 2011/0044354 A1 | 2/2011 | Wei | |
| 2011/0067030 A1 | 3/2011 | Isard et al. | |
| 2011/0154339 A1 | 6/2011 | Lee et al. | |
| 2011/0173410 A1 | 7/2011 | Castillo et al. | |

OTHER PUBLICATIONS

Shafer et al., A Storage Architecture for Data-Intensive Computing, Thesis, Rice University, May 2010, pp. 1-174.
Kim et al., Improving MapReduce Performance by Exploiting Input Redundancy, Journal of Information Science and Engineering 27, 2011, pp. 789-804.
Lee et al., Topology-Aware Resource Allocation for Data-Intensive Workloads, APSys 2010, Aug. 30, 2010, pp. 1-5.
Warneke, Daniel, Massively Parallel Data Processing on Infrastructure as a Service Platforms, Dissertation, Berlin 2011, pp. 1-159.

* cited by examiner

*Primary Examiner* — Abdullah Al Kawsar
*Assistant Examiner* — Dar-Euam Nam
(74) *Attorney, Agent, or Firm* — Lieberman & Brandsdorfer, LLC

(57) ABSTRACT

Embodiments of the invention relate to a shared group of resource and efficient processing of one or more jobs in the share group of resources. Tools are provided in the shared group of resource to assess and organize a topology of the shared resources, including physical and virtual machines, as well as storage devices. The topology is stored in a known location and utilized for efficient assignment of one or more jobs responsive to the hierarchy.

24 Claims, 13 Drawing Sheets

| | Job node set (980) | Preferred node set (910) | Running node set (920) | Unscheduled node set (930) | Unscheduled aggregator node (940) | Rack node set (950) | Physical host node set (960) | Sink (970) |
|---|---|---|---|---|---|---|---|---|
| Supply | $\sum (N_{v_j})$ | 0 | 0 | 0 | 0 | 0 | 0 | $-\sum (N_{v_j})$ |
| Incoming link from | N/a | Job | Job | Job | all unschedule nodes | Job higher rack | rack, preferred nodes set, running nodes set | computer, unscheduled aggregator |
| Outgoing link to (cap., cost) | Rack$(N_{v_j}, \rho_j)$ Prefer$(N_{v_j}, \theta_j)$ Run$(N_{v_j}, \phi_j)$ U$(N_{v_j}, \varepsilon_j)$ | Physical host $(d_i, 0)$ | Physical host $(r_i, 0)$ | unscheduled aggregator $(N_{v_j}, 0)$ | sink $(N_{unsched}, 0)$ | computer $(N_{r_k}, 0)$ | sink $(N_{vm}, 0)$ | N/A |
| flow | $N_{v_j}$ | $0/N_{v_j}$ | $0/N_{v_j}$ | $0/N_{v_j}$ | $0/N_{unsched}$ | $0/N_{r_k}$ | 0, 1 | $-\sum (N_{v_j})$ |

FIG. 9

EFFICIENT EXECUTION OF JOBS IN A SHARED POOL OF RESOURCES

BACKGROUND

This invention relates to an efficient approach for utilization of job processing in a shared pool of resources. More specifically, the invention relates to assessing the virtual and physical topology of the shared resources and processing jobs responsive to the combined topology.

MapReduce is a framework for processing highly distributable problems across huge datasets using a large number of computer nodes. In instances where all of the nodes use the same hardware or a grid if the nodes use different hardware, the framework is commonly referred to as a cluster. Computational processing can occur on data stored either in a filesystem or a database. Specifically, a master node receives a job input and partitions the job into smaller sub-jobs, which are distributed to the other nodes in the cluster or grid. In one embodiment, the nodes in the cluster or grid are arranged in a hierarchy, and the sub-jobs may be further partitioned and distributed. The nodes responsible for processing the sub-jobs return processed data to the master node. More specifically, the processed data is collected and combined by the master node to form an output. Accordingly, MapReduce is an algorithmic technique for the distributed processing of large amounts of data associated with a job.

As described above, MapReduce enables distribution of data processing across a network of nodes. Although there is a convenience factor associated with use MapReduce, there is performance issues associated with current uses of MapReduce for processing jobs.

BRIEF SUMMARY

This invention comprises a system and article for efficient processing of jobs in a shared pool of resources.

In one aspect, a system is provided with tools to support efficient processing of jobs in a shared pool of resources. The shared pool of resources includes a physical host in communication with a plurality of physical machines. Each physical machine may support at least one virtual machine, and each physical machine includes an embedded monitor to collect virtual machine status from a local virtual machine. Similarly, each virtual machine is provided with an embedded agent. A functional unit is provided in communication with the physical host. The functional unit includes tools to support efficient processing of a job responsive to a topological architecture of the shared pool of resources. More specifically, the tools include a director, in communication with the host, to periodically communicate with each embedded monitor, and to gather and organize a topology underlying a virtual topology of the shared pool of resources. The topology includes both the storage topology of data storage and associated resource utilization information. The director leverages the organized topology for assignment of the job to one or more of the shared resources, so that the job supports efficient performance of job associated I/O.

In a further aspect, a computer program product is provided for efficient processing of jobs in a shared pool of resources. The computer program product includes a computer readable non-transitory storage medium having computer readable program code embodied therewith. When executed on a computer, the computer readable program code causes the computer to collect information from the resources in the shared pool. The collected information is communicated to a physical host in communication with one or more physical machines and associated virtual machines. More specifically, the collected information includes, but is not limited to, virtual machine information and physical information. Program code is provided to gather local topology information of the shared pool of resources based upon the collected information, and to periodically communicate the gathered topology information with an embedded monitor of the physical machine. In addition, program code is provided to organize the gathered topology information. The topology information includes, but is not limited to, a storage topology underlying a virtual topology and associated resource utilization information. Program code is provided to leverage the organized storage topology information and to responsively assign a job to a select virtual machine in the shared pool. The job assignment includes supporting efficient performance of job associated I/O.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 9 depicts a table with values assigned to the flow graph for virtual machine placement and node categorization.

DETAILED DESCRIPTION

Figure 1:
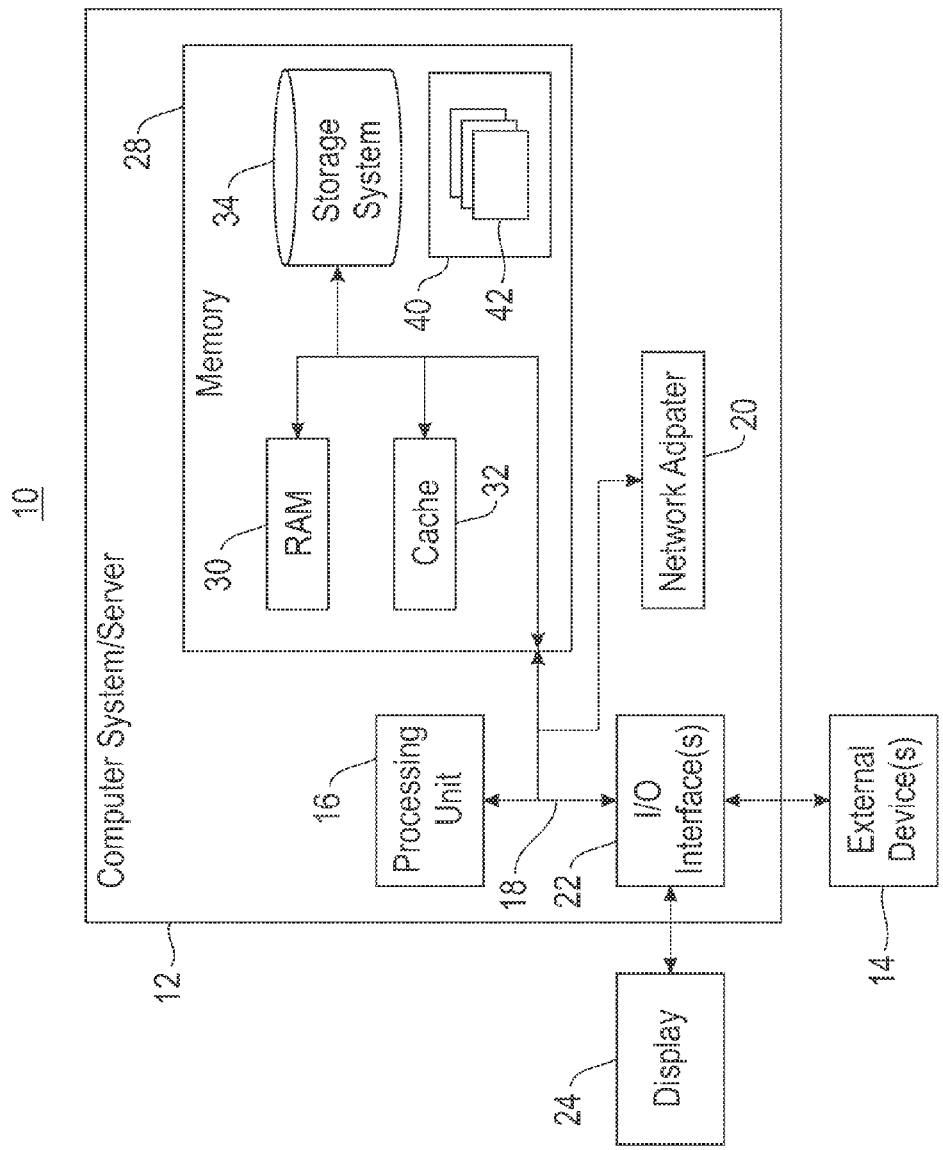
FIG. 1 depicts a cloud computing node according to an embodiment of the present invention.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit(s) described in this specification has been labeled with tools in the form of manager(s) and director(s). A manager or director may be implemented in programmable hardware devices such as field programmable gate arrays, programmable array logic, programmable logic devices, or the like. The manager(s) or director(s) may also be implemented in software for processing by various types of processors. An identified manager or director of executable code may, for instance, comprise one or more physical or logical blocks of computer instructions which may, for instance, be organized as an object, procedure, function, or other construct. Nevertheless, the executable of an identified manager or director need not be physically located together, but may comprise disparate instructions stored in different locations which, when joined logically together, comprise the managers and directors and achieve the stated purpose of the managers and directors.

Indeed, a manager or director of executable code could be a single instruction, or many instructions, and may even be distributed over several different code segments, among different applications, and across several memory devices. Similarly, operational data may be identified and illustrated herein within the manager or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove. In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system-executable instructions, such as program modules, being executed by a computer system. Generally, program modules may include routines, programs, objects, components, logic, data structures, and so on that perform particular jobs or implement particular abstract data types. Computer system/server (12) may be practiced in distributed cloud computing environments where jobs are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16). Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating systems, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14), such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
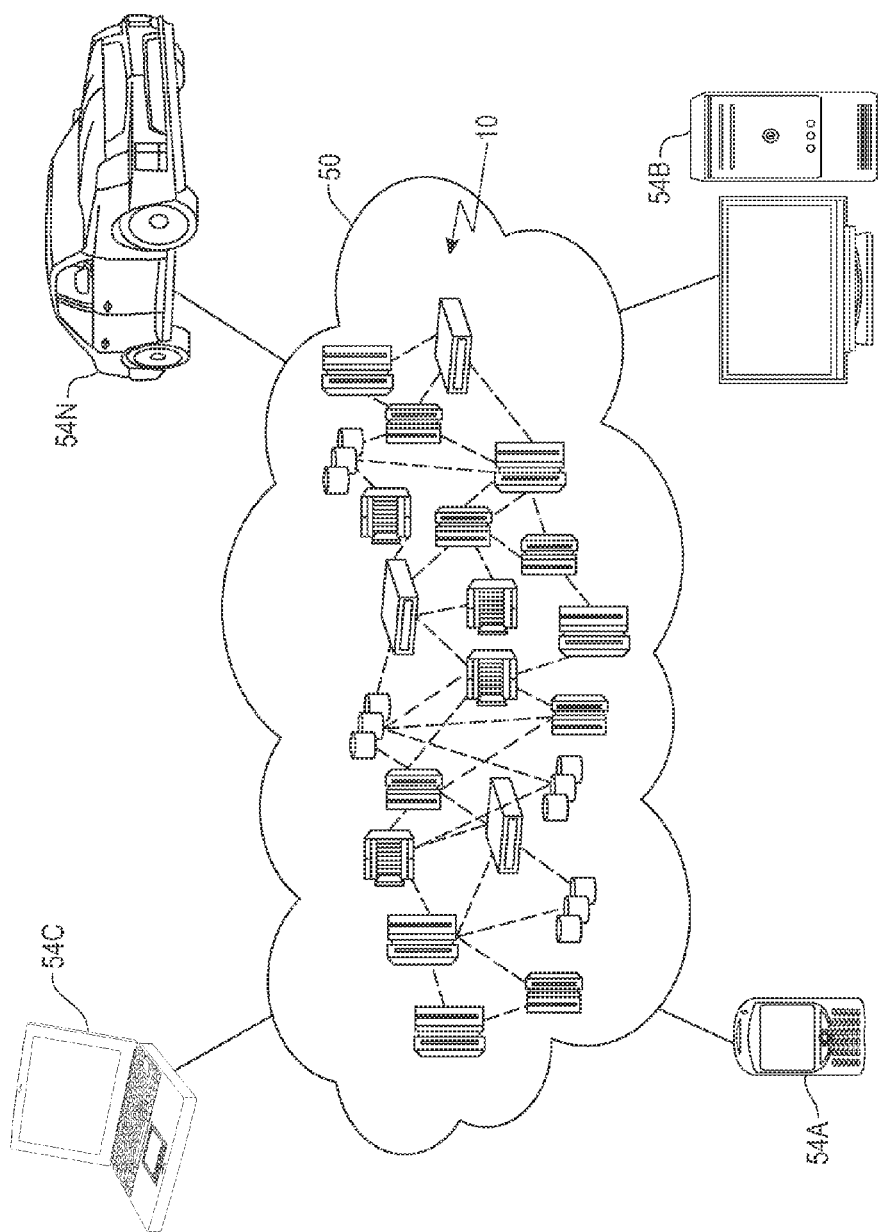
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A)-(54N) shown in FIG. 2 are intended to be illustrative only and that computing nodes (10) and cloud computing environment (50) can communicate with any type of computerized device over any type of network and/or network addressable connection (e.g., using a web browser).

Figure 3:
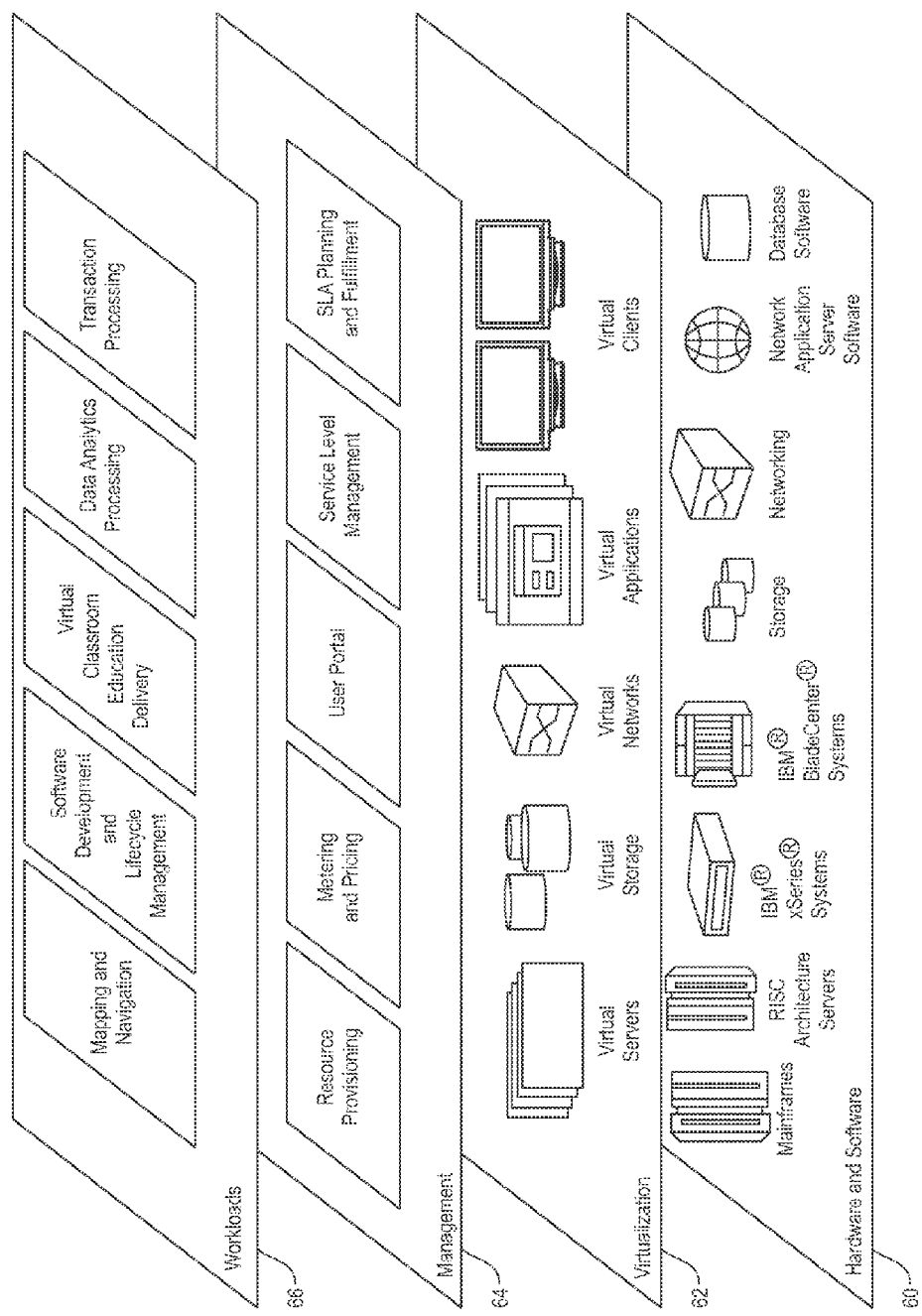
FIG. 3 depicts abstraction model layers according to an embodiment of the present invention.

Referring now to FIG. 3, a set of functional abstraction layers provided by cloud computing environment (50) is shown. It should be understood in advance that the components, layers, and functions shown in FIG. 3 are intended to be illustrative only and embodiments of the invention are not limited thereto. As depicted, the following layers and corresponding functions are provided: hardware and software layer (60), virtualization layer (62), management layer (64), and workload layer (66). The hardware and software layer (60) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers; virtual storage; virtual networks, including virtual private networks; virtual applications and operating systems; and virtual clients.

In one example, management layer (64) may provide the following functions: resource provisioning, metering and pricing, user portal, service level management, and SLA planning and fulfillment. The functions are described below. Resource provisioning provides dynamic procurement of computing resources and other resources that are utilized to perform jobs within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and jobs, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include, but is not limited to: mapping and navigation, software development and lifecycle management, virtual classroom education delivery, data analytics processing, job processing, and processing one or more jobs responsive to the hierarchy of virtual resources within the cloud computing environment.

A virtual machine is a software and/or hardware implementation of a computer that executes programs similar to a physical machine. The virtual machine supports an instance of an operating system along with one or more applications to run in an isolated partition within the computer. In one embodiment, the virtual machine enables different operating systems to run in the same computer simultaneously. One physical machine may support multiple virtual machines. Multiple operating systems can run in the same physical machine, and each of the virtual machines may process jobs with different operating systems. Accordingly, the use of one more virtual machines associated with a single physical machine supports efficient use of hardware while processing multiple jobs.

Efficient use of a virtual machine configuration in a cloud computing system is challenging due to the distributed nature of the physical topology of the physical machines, i.e. nodes. More specifically, the concerns pertain to a assessing and exposing the physical topology underlying the virtual topology of the cloud computing system and leveraging job processing responsive to the physical and virtual topology.

A cloud platform, referred to herein as CAM, is provided to combine a cluster file system with a resource schedule. CAM adopts a three level approach to avoid placement anomalies, the three levels include data placement, virtual machine-job placement, and job placement. With respect to data placement, data is placed within the cluster based on offline profiling of the jobs that most commonly run on the data. Job placement is affected by CAM selecting the best possible physical node(s) to place the sets of virtual machines assigned to a job. In order to further minimize the possibility of a placement anomaly, CAM exposes otherwise hidden compute, storage, and network topologies to the job scheduler such that it make optimal job assignments. CAM reconciles resource allocation with a variety of other competing constraints, such as storage utilization, changing CPU load and network link capacities using a flow-network based algorithm that is able to simultaneously reduce the specified constraints for both initial placement and for readjusting under virtual machine and data migration.

Figure 4:
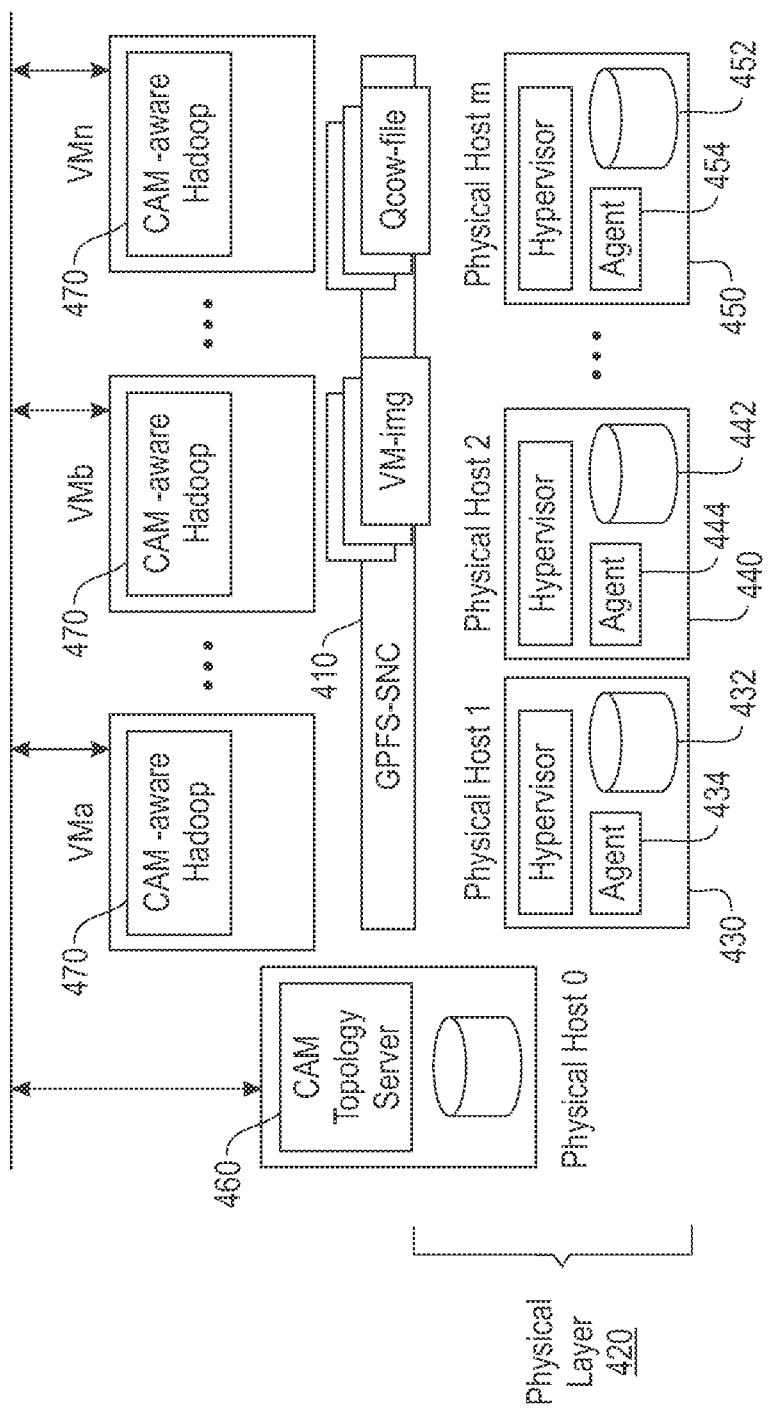
FIG. 4 depicts a block diagram illustrating the architecture for using cloud aware MapReduce.

FIG. 4 is a block diagram (400) illustrating the overall architecture for using CAM. The physical resources supporting the cloud consist of a cluster of physical nodes with local storage directly attached to the individual nodes. As shown, CAM uses a filesystem, which in one embodiment may be a General Parallel File System-Shared Nothing Cluster, (410) to provide its storage layer. GPFS-SNC is designed to be a cloud storage platform, which supports timely and resource-efficient deployment of virtual machines in the cloud. GPFS-SNC manages the local disks directly attached to a cluster of commodity physical machines. As shown, the physical layer (420) is illustrated with three commodity physical machines (430), (440), and (450). The quantity of physical machines shown herein is for illustrative purposes. In one embodiment, the quantity may include a smaller or larger quantity of commodity physical machines. Each of these machines has a local disk (432), (442), and (452), respectively. Filesystem (410) supports co-locating all blocks of a file at one location, rather than stripping the file across the network. This enables a virtual machine I/O request to be serviced locally from the stored location instead of remotely from physical hosts across the network. CAM leverages this feature to ensure that co-located virtual machine images are stored at one location and can be accessed efficiently.

Filesystem (410) also supports an efficient block-level pipelined replication scheme, which guarantees fast distributed recovery and high I/O throughput through fast parallel reads. This feature is useful for CAM for achieving efficient failure recovery. In addition, filsystem (410) specifies a user level application program interface, API that can be used to query the physical location of files. CAM uses this API to get actual block location information for determining storage closeness for data and virtual machine placement. CAM employs three components to provide topology awareness. As shown, a server (460) is provided in communication with the physical layer (420). The server (460), also referred to herein as the CAM topology server, provides topology information required to enable a scheduler to make optimal job assignment. Information exposed by the server (460) consists of network and storage topologies, and other dynamic node-level information, such as CPU load. Further as shown, each of the physical machines (430), (440), and (450) has an agent (434), (444), and (454), respectively. Each agent runs on its respective physical machine and periodically collects and conveys to the server (460) a variety of pieces of data about the respective machine, such as utilization of outbound and inbound network bandwidth, I/O utilization, and CPU, memory, and storage load. The server (460) consolidates dynamic information it receives from the agents (434), (444), and (454), and serves it along with topology information about each job running in the cluster. The topology information is derived from existing virtual machine placement configuration. A job scheduler (470) interfaces with the server (460) to obtain accurate and current topology information. The scheduler (470) readjusts job placement accordingly whenever a change in the configuration is observed. Accordingly, the job scheduler leverages the storage and physical host resource utilization in CAM.

Network topology information is represented by a distance matrix that encodes the distance between each pair of virtual machines as cross-rack, cross-node, or cross-virtual machine. When two virtual machines are placed on the same node, they are connected through a virtual network connection. By virtue of the fact that the virtual machines share the same node hardware, the virtual network provides a high-speed medium that is significantly faster than the inter-node or inter-rack links. Network traffic between the virtual machines on the same node does not have to pass through the hardware link. The network virtual device forwards the traffic in-memory through highly optimized ring buffers.

Storage topology information is provided as a mapping between each virtual device containing the dataset and the virtual machine to which it is local. In a native hardware context, a disk attached to a node can be directly accessed through a PCI bus. In the cloud, however, the physical blocks belonging to a virtual machine image attached to a virtual machine could be located on a different node. Even though a virtual device might appear to be directly connected to the virtual machine, the image file backing the device could be across the network, and potentially closer to another virtual machine in the cluster than the one it is directly attached to. The server (460) queries the physical image location through an API and presents the information to the scheduler (470).

Examples of specific API provided by the server (460) is described in Table 1 below:

TABLE 1

| API | Description |
| --- | --- |
| Int get_VM_distance (string vm1, string vm2) | Returns the distance between two virtual machines |
| struct block_location get_block_location (string src, long offset, long length) | Returns the actual location of blocks |
| int get_vm_networking (string vm, struct networkinfo) | Returns the network utilization information of physical host on which the virtual machine is running |
| int get_vm_diskinfo (string vm, string device, struct diskinfo) | Returns disk utilization information |
| int get_vm_cpuinfo (string vm, struct cpuinfo) | Returns CPU utilization information of the physical host on which the virtual machine is running |

The instruction get_vm_distance, provides job to the job scheduler (470) with hints of the network distance between two virtual machines. The distance is estimated based on observed data transfer rates between the virtual machines, and in one embodiment is expressed in units of bandwidth. The instruction get_block_location, supports getting the actual block location instead of the location of a virtual machine, thereby guaranteeing locality. The instructions get_vm_networkinfo, get_vm_diskinfo, and get_vm_cpuinfo facilitate the job scheduler (470) with respect to querying the I/O and CPU contention information related to network and disk utilization. In one embodiment, the scheduler (470) can leverage this additional information to make smarter decisions, including in one embodiment placing I/O intensive jobs on physical hosts that have idle I/O resources.

Figure 5:
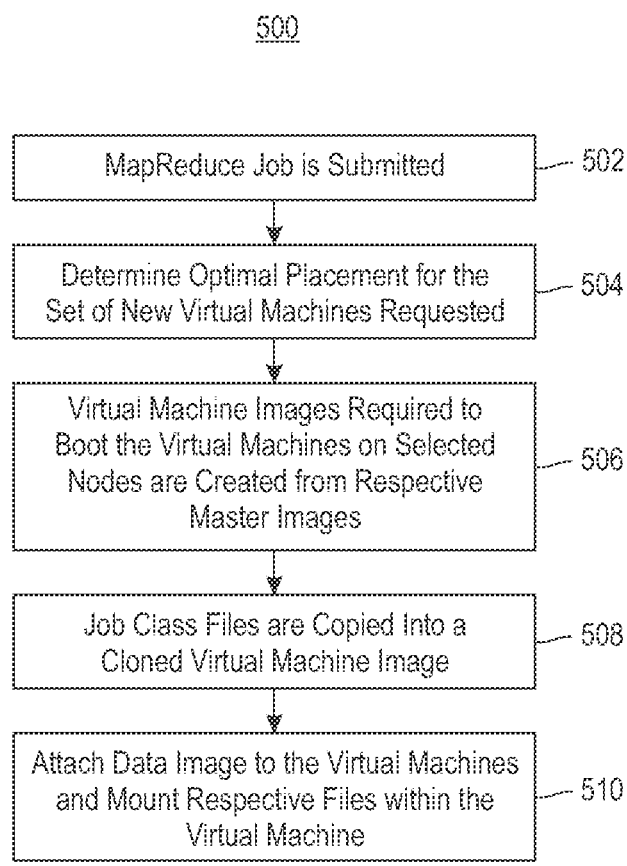
FIG. 5 depicts a flow chart illustrating allocation of resources and management of data and virtual machine placement.

FIG. 5 is a flow chart (500) illustrating allocation of resources and management of data and virtual machine placement. As described, CAM is a cloud platform with specific interfaces and support for running MapReduce jobs. A dataset to be processed is initially placed on a general purpose filesystem (GPFS). More specifically, storage and compute resources are not segregated. A MapReduce job is submitted by providing the application, e.g. relevant java class files, indicating a previously uploaded dataset corresponding to the job, and the number and type of virtual machines to be used for the job (502). In one embodiment, each virtual machine supports several MapReduce jobs slots depending on the number of virtual CPUs and virtual RAM allocated to the virtual machine. The greater the number of virtual machines assigned to a job, the faster the job is completed.

CAM determines an optimal placement for the set of new virtual machines requested (504) by considering factors including, but not limited to, current workload distribution among cluster node, distribution of the input datasets required by the job, and the physical locations of the required master virtual machine images. The virtual machine images required to boot the virtual machines on the selected nodes are created from the respective master images (506). In one embodiment, a copy-on-write mechanism provided by the general purpose filesystem is utilized for creating the virtual machine, as this allows quickly provisioning a virtual machine image instance without requiring a data copy of a master image. Following step (506), job class files are copied into a cloned virtual machine image (508). In one embodiment, the copying at step (508) takes place by mounting the image as a loop-back file system. Finally, the data images are attached to the virtual machines and the respective files are mounted within the virtual machine (510), as this enables jobs to access data contained therein.

In relationship to FIG. 4, each physical machine (430), (440), and (450) is equipped with local disks (432), (442), and (452), respectively. A distributed file system (410) also referred to herein as GPFS-SNC, is installed on top of the physical machines (430), (440), and (450). The virtual machine images (436), (446), and (456) are stored in the distributed file system (410). In one embodiment, a cloud manager allocates resources to jobs and manages data placement and virtual machine placement.

Placement of both data and virtual machines are aspects to be considered with respect to cost. Specifically, placement includes guaranteeing virtual machine closeness, avoiding hotspots, and balancing physical storage utilization according to different job types. Virtual machine closeness expresses cost of accessing data and captures how data should be placed with respect to its associated virtual machines to minimize access times. The hotspot factor expresses the expected load on a machine and identifies machines that do not have enough computational resource(s) to support the assigned virtual machines. To avoid a hotspot, data needs to be placed on the least loaded machine. This can be determined by measuring currently allocated computational resources to the machine and adding to it the expected allocation requirement of the virtual machines that would work with the data to be placed on the machine. Finally, storage utilization expresses a percentage of total physical machine storage space that is in use.

The following table, Table 2, illustrates a table showing the significance of three factors outlined above that affect performance of different workload.

TABLE 2

| Job Type | Virtual Machine Closeness | Hotspot Factor | Storage Utilization |
|---|---|---|---|
| Map and Reduce Intensive | Yes | Yes | Yes |
| Map Intensive | No | Yes | Yes |
| Reduce Intensive | No | No | Yes |

For workloads that are both Map and Reduce intensive, related data should be placed close together and on the least loaded machine. For Map intensive workloads, the data should be placed on the least loaded machine, but does not necessarily need to be placed close together due to the light shuffle traffic in such workload. For Reduce intensive workloads, the only concern is the storage utilization of the machine on which the virtual machine is to be placed. For all types of workloads, it is desirable to place data evenly across racks to minimize the need to rearrange data over time for supporting migrating virtual machines.

Figure 6:
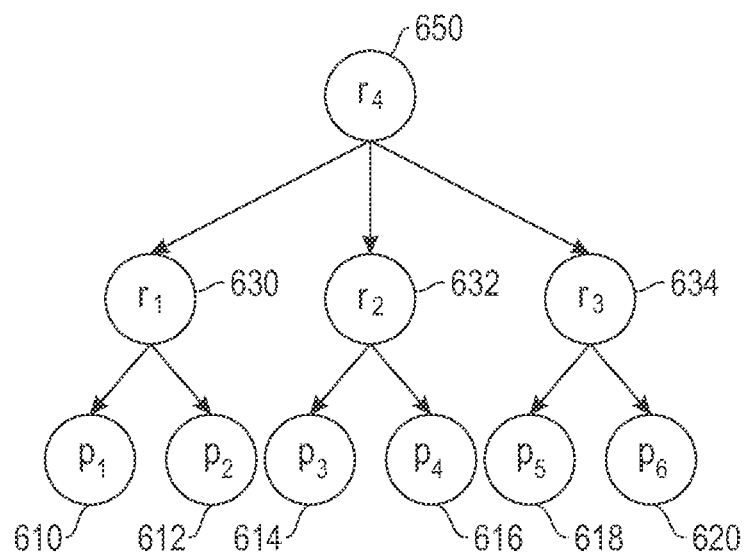
FIG. 6 depicts a flow graph illustrating sample network topology for data placement.

The factors organized in Table 2 are used in constructing a min-cost flow graph that encodes the factors. FIG. 6 is an illustrating of a flow graph (600) illustrating sample network topology for data placement. More specifically, the sample network topology consists of six physical nodes ($p_1$, $p_2$, $p_3$, $p_4$, $p_5$, $p_6$) identified as (610), (612), (614), (616), (618), and (620). The physical nodes are organized into three racks ($r_1$, $r_2$, $r_3$) identified as (630), (632), and (634). A master rack $r_4$, e.g. switch, identified as (650) connects the racks. In one embodiment, the topology shown here can support any topology where network traffic can be estimated. The unit of data placement is a virtual machine image to ensure that an entire image is available at one location.

Figure 7:
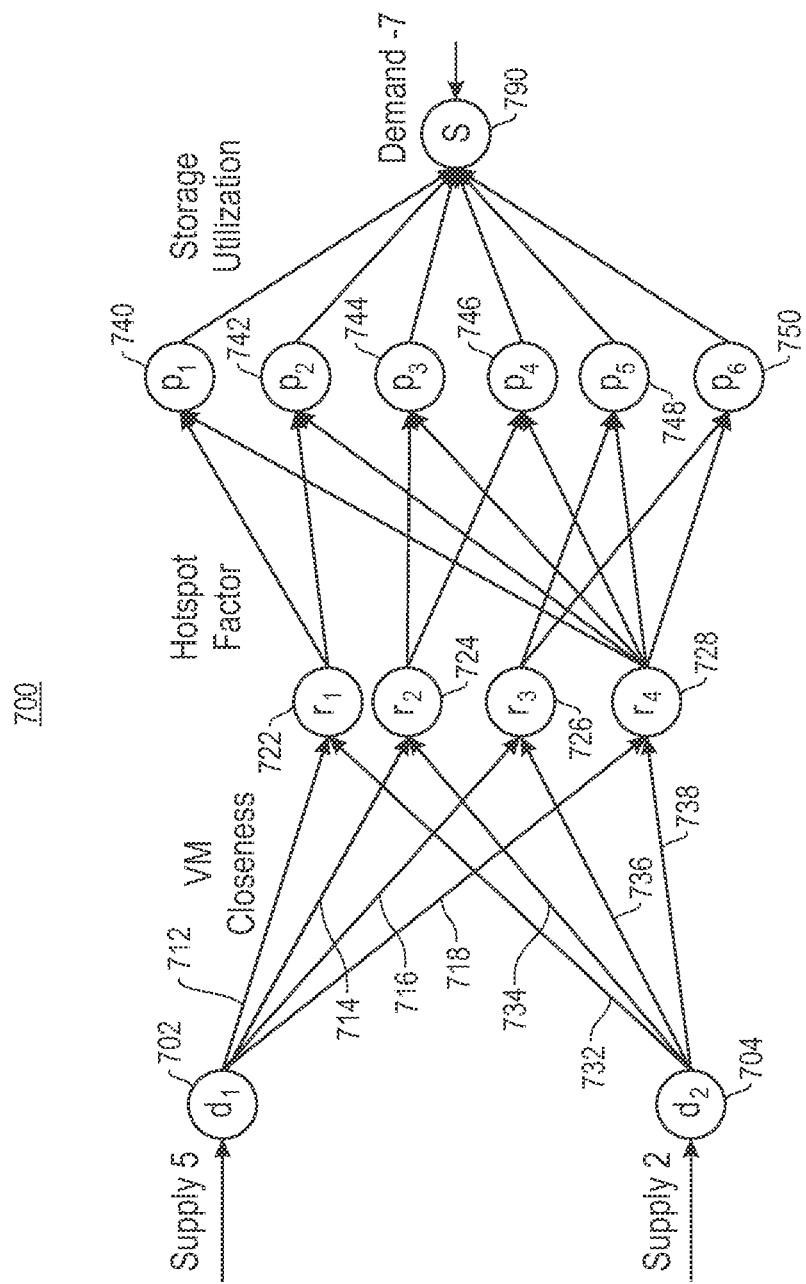
FIG. 7 depicts a flow graph for sample data placement.

Based on the flow graph of FIG. 6, a second flow (700) graph is illustrated in FIG. 7 for sample data placement. Two data items $d_1$, (702), and $d_2$, (704), with requests for 5 and 2 virtual machine images, respectively, are submitted to the cloud, e.g. share pool of resources. The number of virtual machine images requested by a data item is denoted as the data item's supply for the flow graph. A sink node, S (790), is added to the graph to support the virtual machines. The number of virtual machines that a sink node can handle is assigned as a demand value. In the example shown herein, sink node (790) has a demand of seven and is the only place that can receive all of the flows. Each flow graph edge has two parameters attached, including the capacity of the edge and the cost for a flow to go through the edge. The data nodes, $d_1$ (702) and $d_2$ (704), have outgoing links to each rack with virtual machine closeness as costs. As shown, data node $d_1$ (702) has link (712) going to rack $r_1$ (722), data node $d_1$ (702) has link (714) going to rack $r_2$ (724), data node $d_1$ (702) has link (716) going to rack $r_3$ (726), data node $d_1$ (702) has link (718) going to rack $r_4$ (728), data node $d_2$ (704) has link (732) going to rack $r_1$ (722), data node $d_2$ (704) has link (734) going to rack $r_2$ (724), data node $d_2$ (704) has link (736) going to rack $r_3$ (726), and data node $d_2$ (704) has link (738) going to rack $r_4$ (728). Six physical nodes are shown herein, specifically $p_1$ (740), $p_2$ (742), $p_3$ (744), $p_4$ (746), $p_5$ (748), and $p_6$ (750). The hotspot factor is encoded in the links (750), (752), (754), (756), (758), and (760) from the racks to each physical node p within its range. Even though $r_4$ (728) serves as a switch between the racks, it is shown as directly connected to all the physical nodes to ensure that the least loaded machine can be chosen for Map intensive jobs without being constrained by the network topology.

All the physical nodes $p_1$ (740), $p_2$ (742), $p_3$ (744), $p_4$ (746), $p_5$ (748), and $p_6$ (750) are linked to the sink node (790) with storage utilization as link costs. There is no direct link from data item node $d_j$ to the associated physical host $p_j$. This is to support scaling up the system. The following table, Table 3 shows the values assigned to the flow graph for data placement.

TABLE 3

|  | Data set $d_j$ | Rack $r_k$ | Physical host | Sink |
|---|---|---|---|---|
| Supply | $\Sigma(Nd_j)$ | 0 | 0 | $-\Sigma(Nd_j)$ |
| Incoming link from | N/ | $Nd_j$ | Rack $r_k$ | Physical host |
| Outgoing link (capacity, cost) | To rack $(Nd_j, \alpha_{jk})$ | To Physical host $(Cap_i, \beta_i)$ | To sink $(Cap_i, \gamma_i)$ | N/A |

As shown, $Nd_j$ is the number of virtual machine images requested by dataset $d_j$, $\alpha_{jk}$ capture virtual machine closeness. The cost, $\alpha_{jk}$, of outgoing link from the dataset $d_j$ to physical host $p_i$ on which the data is placed on rack $r_k$ is estimated conservatively by the traffic in the shuffle phase as follows:

$$\alpha_{jk} = size_{intermediate-data} * \frac{num_{Reducer}^{-1}}{num_{Reducer}} * distance_{max}$$

where $distance_{max}$ is the network distance between any two nodes in the rack $r_k$.

The hotspot factor is captured using $\beta_i$ for physical node $p_i$ and is estimated by the current and expected load as follows:

$$\beta_i = \alpha*(load_{exp}+load_{curr}-load_{min})$$

where $load_{curr}$ and $load_{min}$ represent the current load and minimum current load, respectively, and a is a parameter that acts as a knob to tune the weight of the hotspot factor with respect to other costs. The expected load, $load_{exp}$, is as follows:

$$load_{exp} = \rho(p_j/(1-p_j)*C \, Res(d_j)$$

where $p_j = \lambda_j/\mu_j$, and $\lambda_j$ represents the number of $d_j$'s associated jobs that arrive within a given time interval, and $\mu_j$ represents the mean time for each virtual machine to process a block.

Storage utilization of a physical node $p_i$ is captured by $\gamma_i$ which is determined by the current storage utilization compared with minimum storage utilization of all $p_i$s, as follows:

$$\gamma_i = b*(storage \, Utilization_{p_i} - storage \, Utilization_{min})$$

where b is a parameter used to fine tune the weight of storage utilization with respect to other factors. Finally with respect to capacity, the following formula is employed as an estimate of capacity for each physical host:

$$Cap_i = freespace_{pi}/size_{VMImg}$$

To enable the graph to capture the correlation between virtual machine image placements for one data request, a split factor parameter is provided to specify whether flows from a node are allowed to be split across different link. In one embodiment, the value of this parameter is defined as true or false. For example, if the split factor for all the links from $d_1$ and $d_2$ are trues, all flows from data nodes will in whole go through one of the $r_1, r_2, r_3, r_4$, but will not be split between the racks. Once a new data upload request is received, the cloud server updates the graph and computes a global optimal solution based on the computed solution for the newly updated data. Accordingly, the scheduler is periodically updated based on the new solution and can accommodate varying loads.

The goal of virtual machine placement is to maximize global data locality and job throughput. Our model considers both virtual machine migration and delayed scheduling of a job as part of the optimal solution. Delaying a job is used to explore better data locality opportunities that can arise in the near future, while minimizing time wasted during the waiting. Migrating a virtual machine belonging to a job enables the scheduler to make room for other suitable jobs or to explore better location opportunity.

Figure 8:
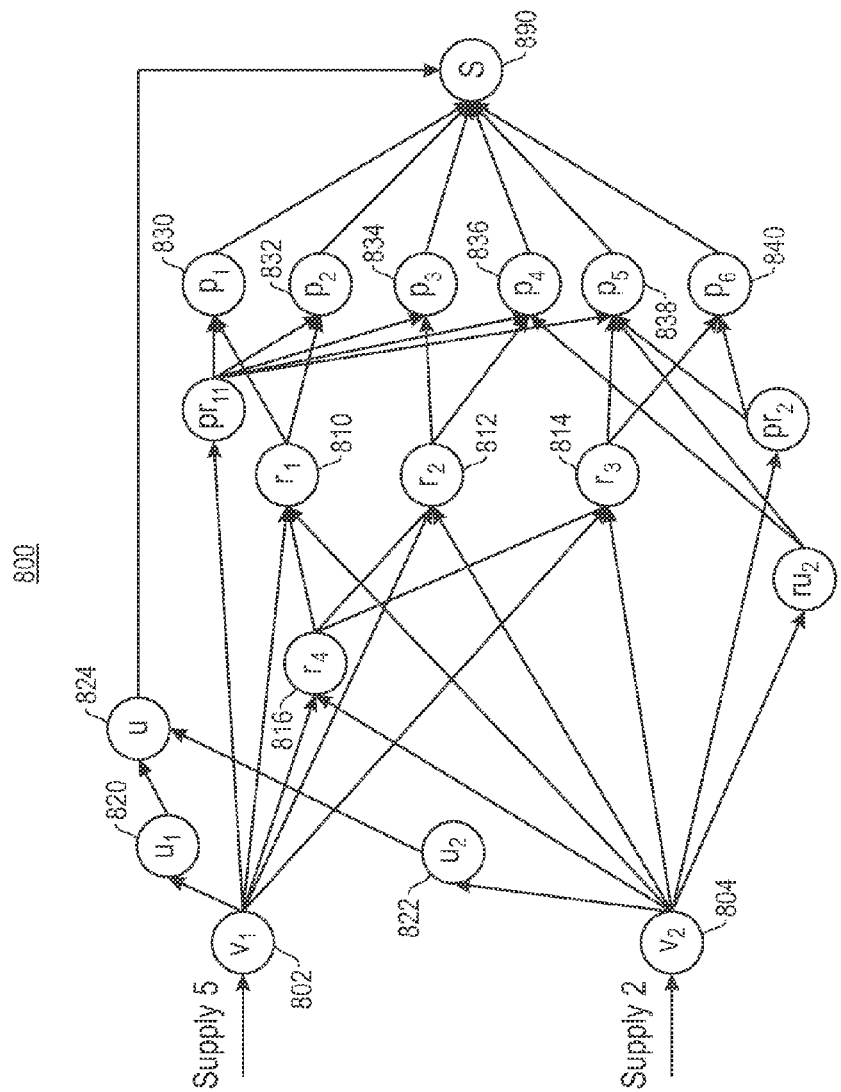
FIG. 8 depicts a flow graph for virtual machine placement.

FIG. 8 is an illustration of a flow graph (800) for virtual machine placement. Each job vj (802) and (804), is submitted to the system at the source node with the number of requested virtual machines, Nvj, as the supply value. The goal of the virtual machine allocator is to maintain the job as unscheduled, e.g. allocate 0, or allocate Nvj, virtual machines for each request. There is a single sink node S (890) with demand equal to the sum of the supply. The request from each job acts as a flow that goes either through the rack nodes (810), (812), (814), and (816), or through the unscheduled nodes (820), (822), and (824), and finally to the sink node (890). If a job is unscheduled, none of its virtual machines are allocated. Otherwise, the flow goes through the physical nodes (830), (832), (834), (836), (838), and (840). Based on the min-cost solution, an allocation scheme with min-cost can be derived. If the virtual machines are allocated to the highest level rack, it implies that the virtual machines can be allocated arbitrarily to any set of nodes in the virtual machines under the rack.

The job type information is modeled as the cost of the edge from each job to the rack nodes in the flow based graph. The higher level rack has higher cost than the lower level rack in terms of reduced traffic. In one embodiment, the cost of the highest level rack is estimated by a worst case virtual machine arrangement with regard to the map and reduced traffic. The cost of the edges to the unscheduled nodes is set to be increased over time so that delayed jobs get allocated sooner than recently submitted jobs. That cost also controls when a job stops waiting for better locality and therefore offers a knob to tune the trade-off between data locality and latency. The aggregated unscheduled nodes control how many virtual machines can remain unscheduled to control system resource utilization and data locality trade-off. The cost of the edges to running nodes set is increased over time and job-progress aware.

FIG. 9 is illustrates a table (900) with values assigned to the flow graph for virtual machine placement and node categorization. Various nodes in the graph are categorized into different types as shown in the table. A preferred node set ($pr_j$) (910) is a set of graph nodes that point to a set of physical node $p_i$ that have a job, $v_j$, associated dataset stored on them. An edge from a preferred node to physical node $p_i$ has the cost of 0 and the capacity of the number of virtual machine disk images stored on physical nodes $p_i$, A running node set ($ru_j$) (920) is a set of dynamically added node that point to physical nodes ($p_i$ s) that are currently hosting the jobs ($v_j$) virtual machines. An edge from $ru_j$ to $p_i$ has a cost of 0 and the capacity of the number of virtual machines running on physical nodes $p_i$. An unscheduled node set, $u_j$, (930) is a set of nodes that provide information about currently unscheduled jobs. The unscheduled node set, $u_j$, has an outgoing edge with capacity $N_{vj}$ and code of 0 to an unscheduled aggregator. An unscheduled aggregator node, u, (940) has an outgoing edge with cost 0 to the sink with capacity defined as:

$$N_{unsched} = \Sigma(N_{vj}) - M + M_{idle}$$

where M is the total number of virtual machines that the cluster can support and $M_{idle}$ denotes the number of idle virtual machine slots allowed in the cluster.

The rack node set, $r_k$, (950) represents a rack in the topology of the cluster. It has outgoing links with cost 0 to its sub-racks, or if it is at the lowest level, to physical nodes. The links have capacity $N_{rk}$ that is the total number of virtual machine slots that can be serviced by its underlying nodes. The physical host node set, $p_i$, (960) has an outgoing link to the sink with capacity being the number of virtual machines that can be accommodated on the physical host $N_{vm}$ and cost 0. The graph has a sink node (970) with demand represented as $\Sigma(N_{vj})$. The job node set, $v_j$, (980) represents each job node $v_j$ with supply $N_{vj}$. It has multiple outgoing edges corresponding to the potential virtual machine allocation decisions for the job set.

The edges include, a rack node set, a preferred node set, a running node set, and an unscheduled node set. The rack node set, $r_k$, has an edge to $r_k$ that indicates that $r_k$ can accommodate $v_j$. The cost of the edge is $p_j$ that is calculated by the map and reduce traffic cost. If the capacity of the edge is greater than $N_{vj}$, it implies that the virtual machines of $v_j$ will be allocated on some preferred nodes on the rack. The preferred node set, $p_{rj}$, has an edge from job $v_j$ to the job wide preferred nodes set, $p_{rj}$, has capacity $N_{vj}$ and cost $\theta$ The cost is estimated by only the reduce phase traffic because in this case map traffic is assumed to be zero. The running node set, $r_{uj}$, has a link from job $v_j$, capacity $N_{vj}$, and cost $\phi = c*T$, where T is the time the job has been executing on the set of machines and c is a constant used to adjust the cost relative to other costs. The unscheduled node set, $u_j$, has an edge to the job-wide unscheduled node $u_j$ with capacity $N_{vj}$ and cost $\epsilon_j$, which corresponds to the penalty of leaving job $v_j$ unscheduled. $\epsilon_j = d*T$, where T is the time that job $v_j$ is left unscheduled and d is a constant used to adjust the cost relative to other costs. The split factor for this link is marked as true, which means the allocation of all the virtual machines are either satisfied or delayed until the next round.

Based on an output of a min-cost flow solution, the virtual machine allocation assignment can be obtained from the graph by locating where the associated flow leads to for each virtual machine request vj. Flow to an unscheduled node indicates that the virtual machine request is skipped for the current round. If the flow leads to a preferred node set, the virtual machine request is scheduled on that set of nodes. If the flow goes to a rack node, it implies that the virtual machines from the job are assigned to arbitrary hosts in that rack.

The number of flows set to a physical host through rack nodes or preferred nodes set is lower than the number of available virtual machines of each physical host. This is guaranteed by the specified link capacity from physical host to sink. Accordingly, all virtual machine requests that are allocated will be matched to a corresponding physical host.

Figure 10:
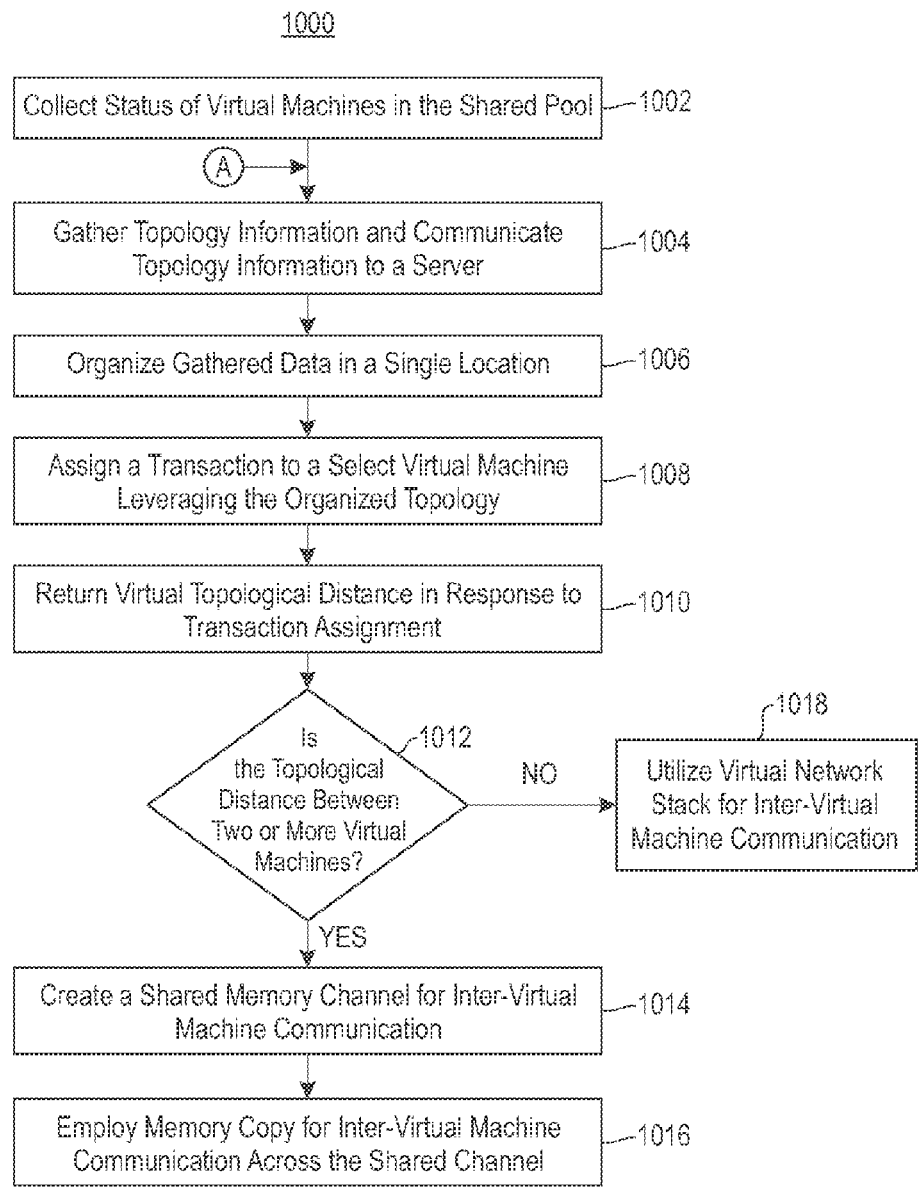
FIG. 10 depicts a flow chart illustrating a process for assessing and leveraging the physical and virtual machine topology in a shared pool of resources.

FIG. 10 is a flow chart (1000) illustrating a process for assessing and leveraging the physical and virtual machine topology in a shared pool of resources. The status of the virtual machines in the shared pool is collected (1002). It is recognized that one or more virtual machines may be assigned to a single physical host, thereby supporting the virtualization of an underlying physical machine. Based upon the collected data, associated topology information is gathered and communicated to a server at a root node of the hierarchical organization of physical and virtual machines (1004).

Each virtual machine is provided with an embedded agent, and each physical machine to which the virtual machines are assigned is provided with an embedded monitor. A server machine is provided in communication with each of the physical machines and functions to periodically collect information from the embedded monitors of the underlying physical machines. The embedded monitors function to sense local topology, disk, and network information. In one embodiment, the embedded monitors are in the form of software that runs on the physical machine to collect status data of the related virtual machines. Similarly, the embedded agent of each virtual machine communicates actual topology and system utilization information to the server machine. Accordingly, each virtual and physical machine includes embedded tools to gather topology associated utilization information and to convey the gathered information to the server machine.

Following the step of gathering the topological data at step (1004), the gathered data is organized in a single location (1006). In one embodiment, the single location may be a root node representing a physical server that is in communication with each of the virtual machines and their associated physical machine. As shown at step (1004), data communicated from the embedded agents of the virtual machines includes actual topology and system utilization information. The data gathered at step (1004) includes a storage topology underlying a virtual topology of the shared pool of resources together with the associated resource utilization information. With the knowledge of the gathered data, a job is assigned to a select virtual machine in the shared pool with the assignment leveraging the organized storage topology information (1008). In one embodiment, the job assignment at step (1008) is designed to support efficient performance of job associated I/O. Accordingly, the process of gathering and organizing local topology information enables jobs to be intelligently assigned to a select virtual machine.

The job assignment at step (1008) may be to one virtual machine or to multiple virtual machines. Similarly, the job may be a read job or a write job. With respect to both scenarios, a virtual topological distance is returned in response to the job assignment (1010). The virtual topological distance may be a distance between two or more virtual machines when the job is assigned to multiple machines, or the virtual topological distance may be between a virtual machine and a block of data when the job is supporting a single virtual machine for a read or write job. Following step (1010), it is determined if the returned topological distance is between at least two virtual machines (1012). A positive response to the determination at step (1012) is followed by creating a shared memory channel for inter-virtual machine data communication between two virtual machines local to the same physical machine (1014). The creation of the shared memory channel supports efficient data transfer between the two virtual machines. More specifically, memory copy may be employed for communication between the virtual machines, thereby avoiding communication across a virtual network stack (1016). Conversely, a negative response to the determination at step (1012) is followed by utilization of the virtual network stack for communication between the virtual machines supporting the assigned job (1018). Accordingly, the physical proximity of virtual machines may lend itself to efficient transfer of inter-virtual machine communication.

A physical machine supports the virtual machine and data blocks support the job. The location of the data blocks within the shared pool affects the assignment of the job to the physical machine and associated virtual machine(s). More specifically, an efficient use of resources in the shared pool ensures a physical proximity of the physical machine to the data blocks. In one embodiment, the job is assigned to a physical machine in the same physical data center as the subject data blocks. Accordingly, part of the process of assignment of the job at step (1008) includes ascertaining a physical location of the data blocks in the shared pool supporting the job.

Figure 11:
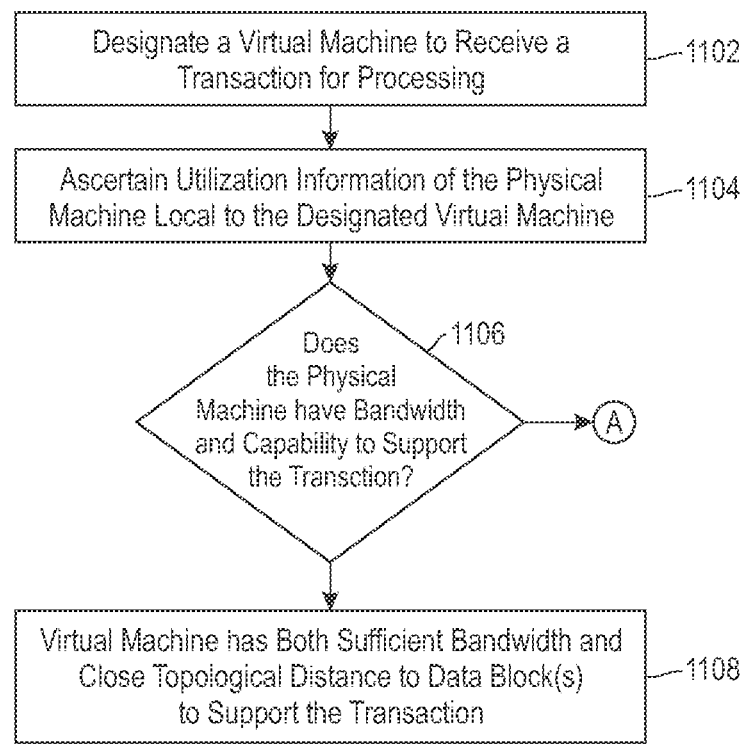
FIG. 11 depicts a flow chart illustrating steps to support the aspect of leveraging the storage topology of the shared pool of resources.

In addition to the location of the blocks, the bandwidth of the underlying physical machine to support the job is critical. The step of leveraging the storage topology information at step (1008) may require one or more additional steps. FIG. 11 is a flow chart (1100) illustrating the additional steps to support the aspect of leveraging the storage topology of the shared pool of resources. As described above, in response to the storage topology, a virtual machine is designated to receive the job for processing (1102). Prior to actual job processing, utilization information of the physical machine local to the virtual machine is ascertained (1104). The utilization information includes, but is not limited to, the processing unit and network utilization information. It is determined if the underlying physical machine has the bandwidth and capability to support the job (1106). A negative response to the determination at step (1106) is followed by returned to selection and assignment of a different virtual machine in the shared pool. Conversely, a positive response to the determination at step (1106) is an indication that the selected virtual machine has both sufficient bandwidth to support the job and a close topological distance to the physical location of the data block(s) to support the job (1108). In one embodiment, the close topological distance includes, but is not limited to, data residing in the same data center as the virtual machine. Accordingly, the aspect of leveraging the storage topology includes an assessment of the operation of the machine together with location of data to support the job.

Figure 12:
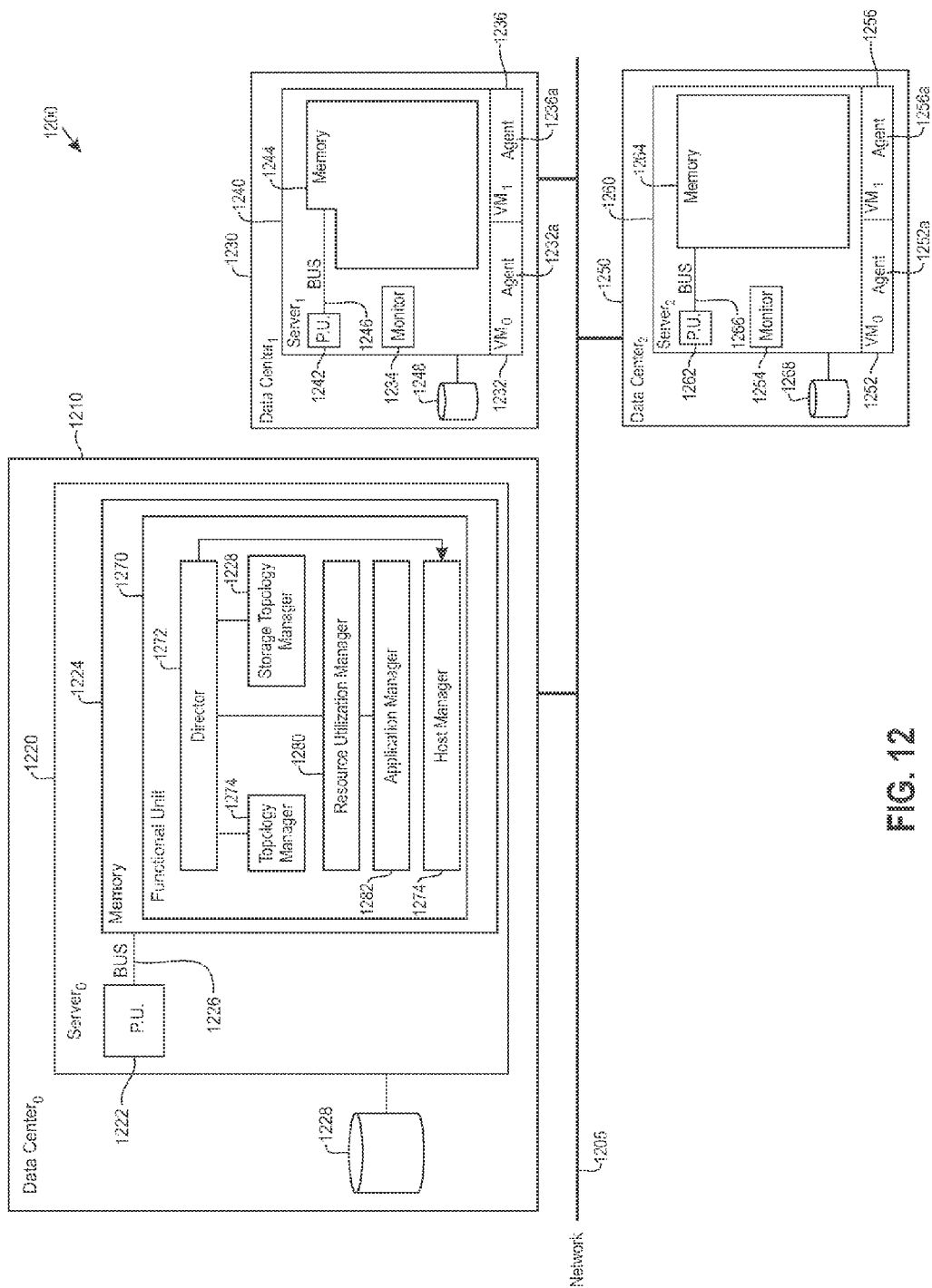
FIG. 12 depicts a block diagram illustrating tools embedded in a computer system to support a technique employed for assessment of resource utilization for use in assignment of a job within a shared pool of resources.

As shown in FIGS. 10-11, a method is provided to employ the topological organization of the machines, together with the location of data blocks to support the job, for intelligent assignment of a job. The job is assigned to a machine that has been assessed to support efficient processing. FIG. 12 is a block diagram (1200) illustrating tools embedded in a computer system to support a technique employed for assessment of resource utilization for use in assignment of a job within a shared pool of resources. Specifically, a shared pool of configurable computer resources is shown with a first data center (1210), a second data center (1230), and a third data center (1250). Although three data centers are shown in the example herein, the invention should not be limited to this quantity of data centers in the computer system. Each of the data centers represents a computing resource. Accordingly, one or more data centers may be employed to support efficient and intelligent assignment of jobs with respect to resource utilization and proximity to data blocks in support of the job(s).

Each of the data centers in the system is provided with at least one server in communication with data storage. More specifically, the first data center (1210) is provided with a first server (1220) having a processing unit (1222), in communication with memory (1224) across a bus (1226), and in communication with data storage (1228); the second data center (1230) is provided with a second server (1240) having a processing unit (1242), in communication with memory (1244) across a bus (1246), and in communication with second local storage (1248); and the third data center (1250) is provided with a third server (1260) having a processing unit (1262), in communication with memory (1264) across a bus (1266), and in communication with third local storage (1268). The first server (1220) is also referred to herein as a physical host. Communication among the data centers is supported across one or more network connections (1205).

The second server (1240) includes two virtual machines (1232) and (1236). The first virtual machine (1232) has an embedded agent (1232*a*) and the second virtual machine (1236) has an embedded agent (1236*a*). In addition, the second server (1240) includes a monitor (1234) to facilitate communication with the first and second virtual machines (1232) and (1236), respectively. The third server (1260) includes two virtual machines (1252) and (1256). The first virtual machine (1252) has an embedded agent (1252*a*) and the second virtual machine (1256) has an embedded agent (1256*a*). In addition, the third server (1260) includes a monitor (1254) to facilitate communication with the first and second virtual machines (1252) and (1256), respectively. Although only two virtual machines (1232) and (1236) are shown in communication with the second server (1240) and only two virtual machines (1252) and (1256) are shown in communication with the third server (1260), the invention should not be limited to these quantities, as these quantities are merely for illustrative purposes. The quantity of the virtual machines in communication with the second and third servers (1240) and (1260), respectively, may be increased or decreased.

As shown herein, each of the second and third servers (1240) and (1260), respectively, supports two virtual machines (1232), (1236) and (1252), (1256), respectively. The monitor (1234) of the server (1230) collects status data from each of the virtual machines (1232) and (1236). Monitor (1234) communicates with embedded agents (1232*a*) and (1236*a*) to collect virtual machine status from virtual machines (1232) and (1236), respectively. Similarly, monitor (1254) collects status data from each of the virtual machines (1252) and (1256), and specifically embedded agents (1252*a*) and (1256*a*), respectively.

The first server (1220) is provided with a functional unit (1270) having one or more tools to support intelligent assignment of one or more jobs in the shared pool of resources. The functional unit (1270) is shown local to the first data center (1210), and specifically in communication with memory (1224). In one embodiment, the functional unit (1270) may be local to any of the data centers in the shared pool of resources. The tools embedded in the functional unit (1270) include, but are not limited to, a director (1272), a topology manager (1274), a hook manager (1276), a storage topology manager (1278), a resource utilization manager (1280), and an application manager (1282).

The director (1272) is provided in the shared pool to periodically communicate with monitors (1234) and (1254) to organize and retain in a single location a storage topology underlying a virtual topology of the shared pool of resource, together with associated resource utilization information. More specifically, the communication of the director (1272) with the monitors (1234) and (1254) supports gathering and organization of the topology of the shared pool of resources. By organizing and understanding the topology data, the director (1272) may leverage the resource utilization information to intelligently assign a job to one or more of the shared resources in the pool, and in a manner that support efficient performance of job associated I/O. Accordingly, the director (1272) both gathers and leverages the topology to support efficient processing of read and write jobs in the shared pool of resources.

As described above, several managers are provided to support the functionality of the director (1272). The topology manager (1274), which is in communication with the director (1272), functions to return a virtual topological distance data to the director (1272). Virtual topological distance data includes, but is not limited to, a distance between two virtual machines or a distance between a virtual machine and a block of data. For example, two virtual machines in communication with the same server are considered in relatively close proximity. However, a second virtual machine in communication with a second server and a third virtual machine in communication with a third server are considered relatively distant in comparison to the two virtual machines in communication with the same server. The storage topology manager (1278), which is in communication with the director (1272), functions to return a physical location of one or more data blocks in support of a job in the shared pool of resource. In one embodiment, the storage topology manager (1278) returns the physical location of the data blocks to the director (1272), thereby enabling the director to intelligently assign a job to a virtual machine in response to the location of the subject data block(s). Accordingly, the topology manager (1274) functions to address distances within the hierarchy with respect to efficient job processing, and the storage topology manager (1278) functions to address the location of the data block supporting the job.

Three other managers are also provided, including a resource utilization manager (1280), an application manager (1282), and a hook manager (1276). The resource utilization manager (1280) functions to address utilization of one or more physical or virtual resources. Each resource has innate limitations. The resource utilization manager (1280) returns utilization information of a processing unit and network utilization information associated with the underlying physical and virtual machines to the director (1272). The application manager (1282), which is in communication with the resource utilization manager (1280), assigns the job to a virtual machine responsive to the resource utilization information. More specifically, the application manager (1282) ensures that the job assignment to a machine in the topology ensures the machine has a sufficient bandwidth to support the job, as well as a sufficiently close topological distance to data blocks to support the job. Accordingly, both utilization and bandwidth are accounted for by the resource utilization manager (1280) and the application manager (1282), respectively.

In addition to the managers described in detail above, the hook manager (1276) functions to facilitate communication among virtual machines. More specifically, the hook manager (1276), which is in communication with the director (1272), is provided to create a shared memory channel for inter-virtual machine communication. The shared memory channel facilitates communication between two virtual machines sitting on the same physical machine by enabling data transfer between two such virtual machines to take place on the same memory stack, e.g. across the memory channel. Accordingly, the shared memory channel created by the hook manager (1276) supports efficient communication of data within the hierarchical structure of the shared pool of resources.

As identified above, the director (1272), topology manager (1274), hook manager (1276), storage topology manager (1278), resource utilization manager (1280), and application manager (1282) are shown residing in the functional unit (1270) of the server (1220) local to the first data center (1210). Although in one embodiment, the functional unit (1270) and associated director and managers, respectively, may reside as hardware tools external to the memory (1224) of server (1220) of the first data center (1210), they may be implemented as a combination of hardware and software, or may reside local to the second data center (1230) or the third data center (1250) in the shared pool of resources. Similarly, in one embodiment, the director and managers may be combined into a single functional item that incorporates the functionality of the separate items. As shown herein, each of the director and manager(s) are shown local to one data center. However, in one embodiment they may be collectively or individually distributed across the shared pool of configurable computer resources and function as a unit to assess the topology of processing units and data storage in the shared pool, and to process one or more jobs responsive to the hierarchy. Accordingly, the managers may be implemented as software tools, hardware tools, or a combination of software and hardware tools.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
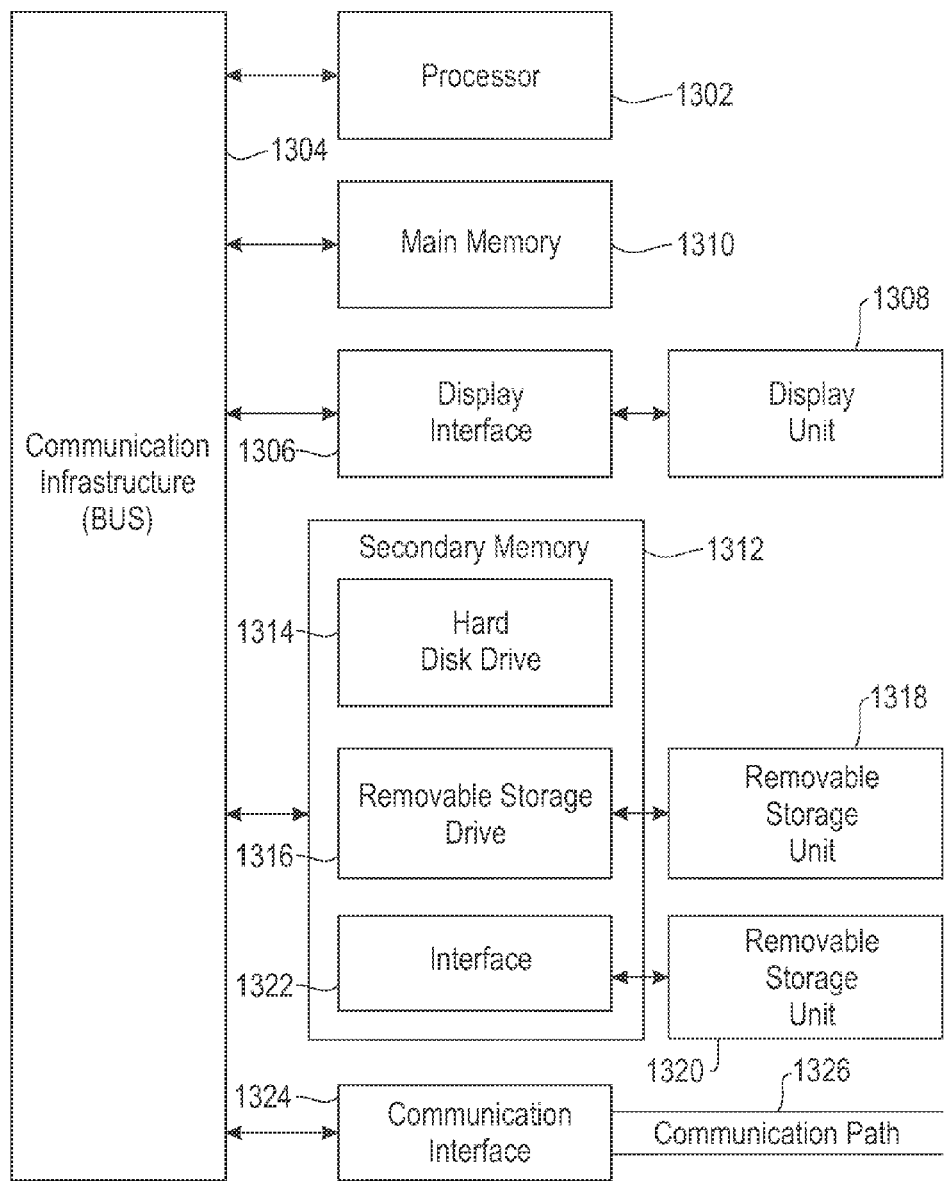
FIG. 13 depicts a block diagram showing a system for implementing an embodiment of the present invention.

Referring now to FIG. 13 is a block diagram (1300) showing a system for implementing an embodiment of the present invention. The computer system includes one or more processors, such as a processor (1302). The processor (1302) is connected to a communication infrastructure (1304) (e.g., a communications bus, cross-over bar, or network). The computer system can include a display interface (1306) that forwards graphics, text, and other data from the communication infrastructure (1304) (or from a frame buffer not shown) for display on a display unit (1308). The computer system also includes a main memory (1310), preferably random access memory (RAM), and may also include a secondary memory (1312). The secondary memory (1312) may include, for example, a hard disk drive (1314) and/or a removable storage drive (1316), representing, for example, a floppy disk drive, a magnetic tape drive, or an optical disk drive. The removable storage drive (1316) reads from and/or writes to a removable storage unit (1318) in a manner well known to those having ordinary skill in the art. Removable storage unit (1318) represents, for example, a floppy disk, a compact disc, a magnetic tape, or an optical disk, etc., which is read by and written to by removable storage drive (1316). As will be appreciated, the removable storage unit (1318) includes a computer readable medium having stored therein computer software and/or data.

In alternative embodiments, the secondary memory (1312) may include other similar means for allowing computer programs or other instructions to be loaded into the computer system. Such means may include, for example, a removable storage unit (1320) and an interface (1322). Examples of such means may include a program package and package interface (such as that found in video game devices), a removable memory chip (such as an EPROM, or PROM) and associated socket, and other removable storage units (1320) and interfaces (1322) which allow software and data to be transferred from the removable storage unit (1320) to the computer system.

The computer system may also include a communications interface (1324). Communications interface (1324) allows software and data to be transferred between the computer system and external devices. Examples of communications interface (1324) may include a modem, a network interface (such as an Ethernet card), a communications port, or a PCM-CIA slot and card, etc. Software and data transferred via communications interface (1324) are in the form of signals which may be, for example, electronic, electromagnetic, optical, or other signals capable of being received by communications interface (1324). These signals are provided to communications interface (1324) via a communications path (i.e., channel) (1326). This communications path (1326) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (1310) and secondary memory (1312), removable storage drive (1316), and a hard disk installed in hard disk drive (1314).

Computer programs (also called computer control logic) are stored in main memory (1310) and/or secondary memory (1312). Computer programs may also be received via a communication interface (1324). Such computer programs, when run, enable the computer system to perform the features of the present invention as discussed herein. In particular, the computer programs, when run, enable the processor (1302) to perform the features of the computer system. Accordingly, such computer programs represent controllers of the computer system.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to application processing and disaster recovery, including, but not limited to, supporting separation of the location of the data from the application location and selection of an appropriate recovery site.

As described herein a platform is provided with a resource scheduler to address performance degradation of MapReduce jobs when running in the cloud environment. Cloud aware MapReduce adopts a three level approach to avoid placement anomalies due to inefficient resource allocation, including: placing data within the cluster that run jobs that most commonly operate on the data, selecting the mode appropriate physical nodes to place the set of virtual machines assigned to a job, and exposing compute, storage, and network topologies to the scheduler. CAM uses a flow network based algorithm that is able to reconcile resource allocation with a variety of other competing constraints, such as storage utilization, changing processor load and network link capacities.

ALTERNATIVE EMBODIMENT

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A system comprising:
    a server for gathering and organizing topology information for a hierarchical assignment of a job to a shared pool of resources having a hierarchical structure, the shared pool of resources a physical topology comprising a plurality of physical machines, each of the physical machines hosting at least one local virtual machine and having an embedded monitor, the embedded monitor collects virtual machine status from the local virtual machine, and each local virtual machine having an embedded agent that collects associated resource utilization from the local virtual machine; and
    the server comprising a functional unit to support efficient processing of the job within the shared pool of resources, the processing responsive to the hierarchical assignment of the job to the shared pool of resources based on physical topology information of the shared pool of resources, the physical topology information including network topology information and storage topology information, the functional unit comprising:
        a director to periodically communicate with each embedded monitor and embedded agent, and to gather and organize the storage topology information comprising data storage information in the shared pool of resources as a mapping between a virtual device containing a data set and the local virtual machine for the virtual device, and the network topology information comprising distance data between each local virtual machine and associated resource utilization information; and
        the director to leverage the assignment of the job based on the topology information for the one or more resources from the shared pool of resources.

2. The system of claim 1, further comprising a topology manager in communication with the director, the topology manager to return the distance data selected from a group consisting of: a distance between two virtual machines, and a distance between a virtual machine and a block of data.

3. The system of claim 1, further comprising a hook manager in communication with the embedded agent of one of the local virtual machines and in communication with the director, the hook manager to create a shared memory channel for inter-virtual machine data communication between a first local virtual machine and a second local virtual machine hosted on a same physical machine of the plurality of physical machines.

4. The system of claim 3, wherein the shared memory channel supports efficient data transfer for both the first and second local virtual machines.

5. The system of claim 1, further comprising a storage topology manager in communication with the director, the storage topology manager to return a physical location of one or more data blocks, the one or more data blocks to support the job assigned to the shared pool of resources.

6. The system of claim 5, further comprising a resource utilization manager in communication with the director, the resource utilization manager to return the associated resource utilization information of the physical machine hosting the local virtual machine, the associated resource utilization information including a processing unit utilization and network utilization.

7. The system of claim 6, further comprising an application manager in communication with the director, the application manager to assign the job to the local virtual machine having sufficient bandwidth to support the job and a close topological distance to the physical location of the one or more data blocks to support the job.

8. A computer program product comprising a computer readable non-transitory storage medium having computer readable program code embodied therewith, the computer readable program code when executed on a computer causes the computer to:
    gather and organize topology information from a shared pool of resources having a hierarchical structure, the shared pool of resources including a physical topology comprising a plurality of physical machines, each of the physical machines hosting at least one virtual machine and having an embedded monitor, the embedded monitor collects virtual machine status from the at least one local virtual machine in the shared pool of resources and each local virtual machine having an embedded agent that collects associated resource utilization from the local virtual machine;
    hierarchically assign a job to the shared pool of resources based on physical topology information of the shared pool of resources, the physical topology information of the shared pool of resources including network topology information and storage topology information;
    periodically communicate with each embedded monitor and embedded agent;

gather and organize the storage topology information, comprising data storage information in the shared pool of resources as a mapping between a virtual device containing a data set and the local virtual machine for the virtual device, and the network topology information comprising distance data between each local virtual machine and associated resource utilization information; and leverage the assignment of the job based on the physical topology information for the one or more resources from the shared pool of resources.

9. The computer program product of claim 8, further comprising program code to return the distance data selected from a group consisting of: a distance between two virtual machines, and a distance between a virtual machine and a block of data.

10. The computer program product of claim 8, further comprising program code to create a shared memory channel for inter-virtual machine data communication between a first local virtual machine and a local second virtual machine hosted on a same physical machine of the plurality of physical machines.

11. The computer program product of claim 10, wherein the shared memory channel supports efficient data transfer for both the first and second local virtual machines.

12. The computer program product of claim 8, further comprising program code to return a physical location of one or more data blocks, the one or more data blocks to support the job assigned to the shared pool of resources.

13. The computer program product of claim 12, further comprising program code to return the associated resource utilization information of the physical machine hosting the local virtual machine, the associated resource utilization information including processing unit utilization and network utilization.

14. The computer program product of claim 13, further comprising program code to assign the job to the local virtual machine having sufficient bandwidth to support the job and a close topological distance to the physical location of the one or more data blocks to support the job.

15. A method comprising:
gathering and organizing topology information, by a server, for a hierarchical assignment of a job to a shared pool of resources, the shared pool of resources including a physical topology comprising a plurality of physical machines, each of the physical machines hosting at least one local virtual machine and having an embedded monitor, the embedded monitor collects virtual machine status from the local virtual machine, and each local virtual machine having an embedded agent that collects associated resource utilization from the local virtual machine;
hierarchically assigning the job to the shared pool of resources based on physical topology information of the shared pool of resources, the physical topology information of the shared pool of resources including network topology information and storage topology information;
periodically communicating with each embedded monitor and embedded agent;
gathering and organizing storage topology information, comprising data storage information in the shared pool of resources as a mapping between a virtual device containing a data set and the local virtual machine for the virtual device, and the network topology information comprising distance data between each local virtual machine and associated resource utilization information; and leveraging the assignment of the job based on the physical topology information for the one or more resources from the shared pool of resources.

16. The method of claim 15, further comprising returning the distance data associated with the job, the distance selected from the group consisting of: a distance between two virtual machines, and a distance between a virtual machine and a block of data.

17. The method of claim 16, further comprising creating a shared memory channel to support the job, the channel supporting inter-virtual machine data communication between a first local virtual machine and second local virtual machine hosted on a same physical machine of the plurality of physical machines.

18. The method of claim 17, wherein the shared memory channel supports efficient data transfer for both the first and second local virtual machines.

19. The method of claim 15, wherein the step of leveraging the assignment of the job based on the physical topology information includes returning a physical location of one or more data blocks, the one or more data blocks to support the job assigned to the shared pool of resources.

20. The method of claim 19, further comprising returning the associated resource utilization information of the physical machine hosting the local virtual machine, the associated resource utilization information including processing unit utilization and network utilization.

21. The method of claim 20, wherein the step of assigning the job to the shared pool of resources includes selecting the local virtual machine having sufficient bandwidth and a close topological distance to the physical location of the one or more data blocks to support the job.

22. A computer implemented method comprising:
gathering and organizing topology information, by a server, for a hierarchical assignment of a job to a shared pool of resources, the shared pool of resources including a physical topology comprising a plurality of physical machines, each of the physical machines hosting at least one local virtual machine and having an embedded monitor, the embedded monitor collects virtual machine status from the local virtual machine, and each local virtual machine having an embedded agent that collects associated resource utilization from the local virtual machine;
hierarchically assigning the job to the shared pool of resources based on physical topology information of the shared pool of resources including network topology information and storage topology information;
periodically communicating with each embedded monitor and embedded agent;
gathering and organizing storage topology information, comprising data storage information in the shared pool of resources as a mapping between a virtual device containing a data set and the local virtual machine for the virtual device, and the network topology information comprising distance data between each local virtual machine and associated resource utilization information; and
leveraging the assignment of the job based on the physical topology information for the one or more resources from the shared pool of resources.

23. The method of claim 22, further comprising ascertaining the distance data associated with the job, the distance data selected from a group consisting of: a distance between two virtual machines, and a distance between a virtual machine and a block of data.

24. The method of claim 23, further comprising creating a shared memory channel to support the job between a first local virtual machine and a second local virtual machine sitting on a same physical machine.

* * * * *